United States Patent [19]
Arita et al.

[11] Patent Number: 5,982,354
[45] Date of Patent: Nov. 9, 1999

[54] MANUAL INPUT UNIT

[75] Inventors: Takashi Arita; Hiroshi Hasegawa, both of Tokyo, Japan

[73] Assignee: Fujitsu Takamisawa Component Limited, Tokyo, Japan

[21] Appl. No.: 08/994,322

[22] Filed: Dec. 19, 1997

[30] Foreign Application Priority Data

Dec. 19, 1996 [JP] Japan ................................. 8-339588
Dec. 8, 1997 [JP] Japan ................................. 9-337268

[51] Int. Cl.$^6$ ....................................................... G09G 5/08
[52] U.S. Cl. ............................ 345/158; 345/157; 463/36
[58] Field of Search .................................. 345/157, 158; 463/36, 37, 49, 51, 52, 53; 434/20, 21, 22

[56] References Cited

U.S. PATENT DOCUMENTS

| | | | |
|---|---|---|---|
| 5,296,871 | 3/1994 | Paley | 345/163 |
| 5,577,962 | 11/1996 | Kounoe et al. | 463/49 |
| 5,670,988 | 9/1997 | Tickle | 345/157 |
| 5,672,108 | 9/1997 | Lam et al. | 463/39 |

Primary Examiner—Richard A. Hjerpe
Assistant Examiner—Duc Dinh
Attorney, Agent, or Firm—Staas & Halsey LLP

[57] ABSTRACT

A manual input unit comprising an actuator section movably supported in a frame, a generator section for outputting a voltage corresponding to a movement of the actuator section, and a signal transmission section for transmitting a data signal corresponding to an output-voltage value of the generator section to an external processing unit. The generator section includes a switching means which is closed when the actuator section is in a reference position and is opened when the actuator section is moved apart from the reference position, and a generating means for generating a voltage linearly corresponding to a displacement of the actuator section from the reference position. The signal transmission section defines, on the basis of a voltage generated from the generating means at an instant when the actuator section departs from the reference position to open the switching means, a voltage subsequently generated from the generating means while the switching means is in an opened state as the output-voltage value of the generator section. The signal transmission section then selects data corresponding to the defined output-voltage value in accordance with a predetermined relationship.

17 Claims, 11 Drawing Sheets

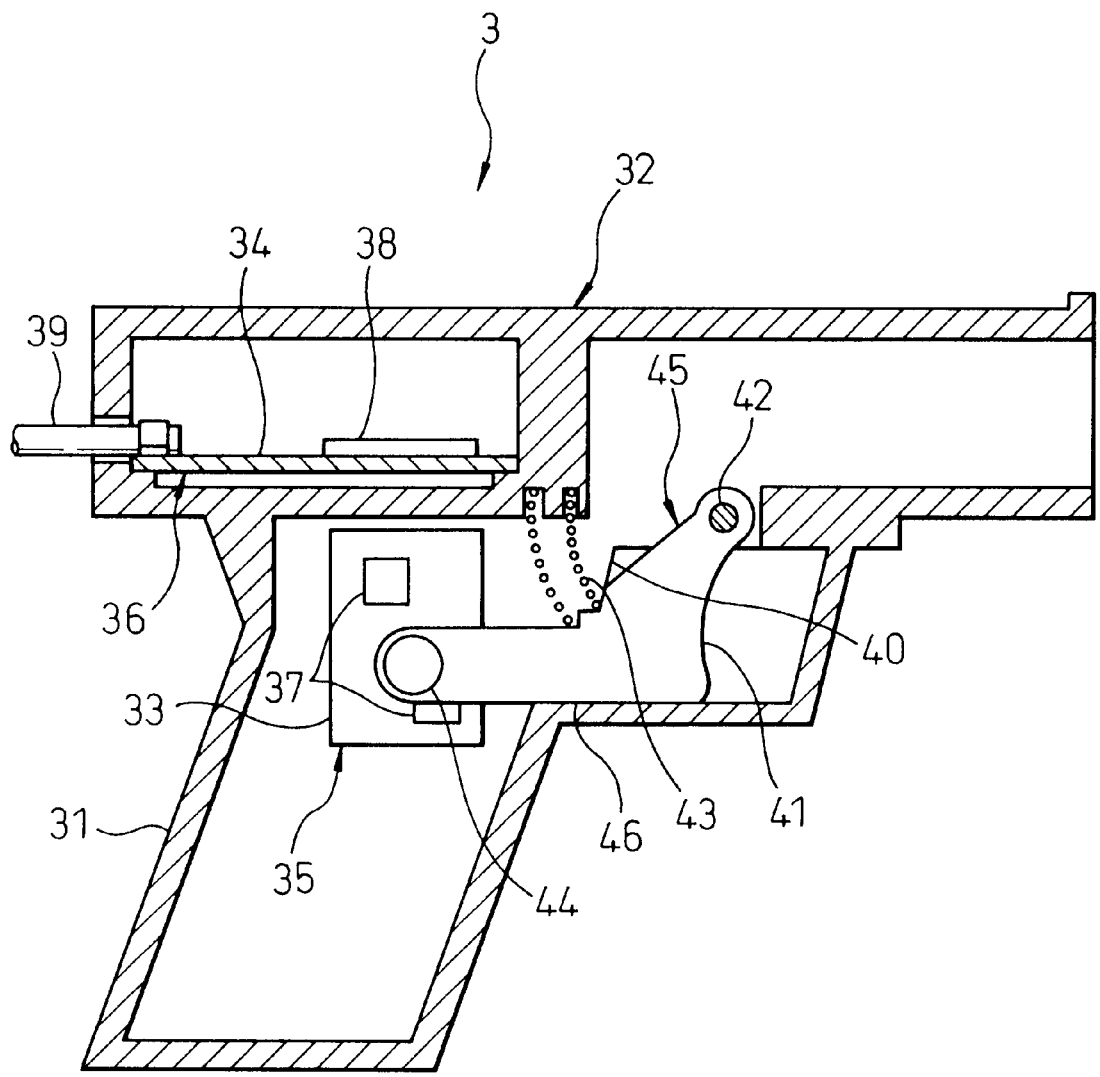

MANUAL INPUT UNIT

BACKGROUND OF THE INVENTION

1. Field of the Invention

The present invention relates generally to input units for data processors, and more particularly to a manual input unit to enter information into a computer or the like by a hand operation. The present invention may be particularly suitable for use in an amusement computer, e.g., a game machine.

2. Description of the Related Art

Recently, various operation systems or applications, in which a pointing device with an excellent manual operability is used in addition to a keyboard as an information entering means for a computer or the like, for processing data through an interactive operation by freely shifting a character or a cursor on a display screen, have been developed. Also, in an amusement computer, e.g., a game machine, various manual input units such as a joystick have been used. The manual input unit used for such an amusement application generally requires some properties different from those of conventional manual input units for ordinary computers.

For example, in a known manual input unit for an amusement computer, which is operated by an operator holding the body of the unit with one or both hands, a weight reduction in the unit and an improvement in operability are required. Also, since various ages of operators, ranging from infants to adults, tend to operate the input unit in various ways, it is preferred that the unit includes a stably operative movable part which is hardly affected by variations in operating parameters such as an inclination of the unit body, vibration applied to the unit body or external forces applied to an actuating section of the unit.

In addition, since this type of manual input unit may be used indoors and outdoors, it is required that an output data signal of the unit is immune to an environmental temperature change. Also, it is desired that the input unit has a relatively simple structure which can reduce the manufacturing cost thereof, considering the maintenance or the parts replacement of the input unit when a defect occurs therein. Thus, there are demands for a manual input unit, particularly in the field of amusement computers, which can reduce the manufacturing cost thereof, can be easily handled and can decrease the possibility of a malfunction due to vibration or a temperature change.

FIG. 9 schematically shows a widely used amusement computer system with a manual input unit. FIG. 10 illustrates an example of the structure of a conventional manual input unit. FIGS. 11A and 11B show the relationship between an output signal and a displacement of actuator in the conventional manual input unit.

The amusement computer system shown in FIG. 9 includes a computer 1 as a game machine, a display 2 for displaying an image, and an manual input unit 3 for entering information, both the display 2 and the input unit 3 being connected to the computer 1. By operating the manual input unit 3, it is possible to freely set a one-dimensional parameter in a game, such as a beam magnitude of a laser gun or a speed of a car, or freely shift a character or a cursor displayed on the display 2 in a two-dimensional manner.

As shown in FIG. 10, the manual input unit 3, which is one example of the input units used in the above amusement computer system, includes a frame 32 having a grip 31 to be grasped by the operator with one or both hands, a generator section 35 and a signal transmission section 36 both fixedly arranged in the frame 32, and a movable actuator section 45 pivotably supported on the frame 32. The frame 32 is generally molded with a resinous material excellent in mechanical strength and capable of easily reducing a weight of the frame.

The generator section 35 includes a printed circuit board 33 fixed to a predetermined position in frame 32, and two magnetoelectric elements 37, such as Hall elements, spaced from each other and mounted on the printed circuit board 33. The signal transmission section 36 is provided with a printed circuit board 34 fixed at a predetermined position in the frame 32 away from the printed circuit board 33, and a CPU 38 mounted on the printed circuit board 34.

The movable actuator section 45 includes a trigger 41 pivoted to the frame 32 by a pin 42 disposed near the grip 31, and a compression coil spring 43 interposed between the frame 32 and the trigger 41 to bias the trigger 41 toward a start position as illustrated. A permanent magnet 44 is fixed on a side surface of a distal end of the trigger 41 away from the pin 42. The magnet 44 acts as a counterpart element for the magnetoelectric elements 37 of the generator section 35 to make the magnetoelectric elements 37 generate a voltage. When the trigger 41 is at the start position, a stopper 46 formed along the lower edge of the trigger is abutted to the inner wall of the frame 32 to inhibit the further rotation of the trigger. In this state, the trigger partially projects forward through an opening 40 formed near the grip 31.

The operator grasps the grip 31 with one hand in a similar manner to the hand operation for a pistol, and squeezes the trigger 41 by finger pressure on the part of the trigger 41 projecting from the opening 40. Thereby, the trigger 41 rotates about the pin 42 in a clockwise direction as seen in the drawing from the start position. Simultaneously, the permanent magnet 44 fixed to the end of the trigger moves upward along an arcuate path about the pin 42 from a lowermost position as illustrated to an uppermost position (not shown).

The two magnetoelectric elements 37 of the generator section 35 are fixed on the printed circuit board 33, so as to be respectively located near the lowermost and uppermost positions of the permanent magnet 44, and do not come into contact with the permanent magnet 44 irrespective of the position of the magnet 44. When the permanent magnet 44 moves along the arcuate path, an output voltage generated from each magnetoelectric element 37 varies in linear correspondence to a variation of the distance between each magnetoelectric element and the permanent magnet 44. The output voltage from each magnetoelectric element 37 is converted to a digital signal and then is passed to the signal transmission section 36.

In the signal transmission section 36 fixed to the upper portion of the frame 32, when the output-voltage value is entered from the generator section 35 to the CPU 38, the CPU 38 selects or retrieves data corresponding to the voltage value from a number of stored data (e.g., data for beam magnitudes of a laser beam gun), and transmits a data signal to the external computer 1 via a coupling cable 39.

For example, the output voltage from the magnetoelectric element 37 located near the uppermost position of the permanent magnet 44 increases in a generally linear manner in proportion to the increase of a displacement of the trigger 41 from the start position, as shown in a solid line in FIG. 11A (the displacement being shown as a linear stroke converted from an angular distance). In this regard, since the magnetoelectric element 37 such as a Hall element is generally susceptible to an environmental temperature change, the characteristic curve shown by the solid line may be shifted or translated to, e.g., another characteristic curve shown by a dotted line, as an environmental temperature varies. As a result, the voltage generated by the magneto-electric element 37 when the trigger 41 is e.g., at the start position (i.e., displacement=0), may be shifted to a voltage "b" from an intrinsic voltage "a", due to the environmental temperature change.

In the case that the CPU 38 is programmed so as to transmit data "0" in response to the input voltage "a" and data 256 in response to the input voltage "c", as shown in FIG. 11B, if a voltage "b" is erroneously entered due to the temperature change when the trigger 41 is in the start position, data "d" might be transmitted, which is different from the intrinsic data "0". As a result, the computer 1 may operate in such a manner as to not conform to a command from the manual input unit 3.

To solve such problems, in the manual input unit 3 described above, two magnetoelectric elements 37 are respectively arranged near the lowermost and uppermost positions of the arcuate path of the permanent magnet 44, and connected to each other to output a voltage, in a differential manner, from both elements 37, so that the data can be selected in response to the differential voltage value of two output voltages of both elements 37, while maintaining the relationship shown in FIG. 11B. According to this arrangement, since output voltages of both magnetoelectric elements 37 vary in the same manner as the environmental temperature varies, the variations in the output voltages of both elements are cancelled by adopting the differential value of those output voltages. Thus, it is possible to transmit data which accurately corresponds to the displacement of the trigger 41, without affecting the data selection.

The manual input unit for the amusement computer described above is adapted to transmit data corresponding to the displacement of the movable actuator section by using the magnetoelectric elements and the permanent magnet which cannot come into contact with each other, so that certain advantages are obtained, i.e., a weight reduction of the unit and an improvement in operability can be accomplished, and also the generator section and the signal transmission section are hardly susceptible to vibration and external forces during the operation and thus can be stably operated. In addition, since two magnetoelectric elements are used, it is possible to eliminate the effect of the environment temperature change, and thus to translate a data signal correctly corresponding to the displacement of the movable actuator section so that the external processing unit operates in conformation to a command.

However, this manual input unit still has problems in that, since it is necessary to use two relatively expensive magnetoelectric elements for eliminating the effect of the environmental temperature change, which in turn requires an additional printed circuit board separate from the signal transmission section for mounting the magnetoelectric elements near the lowermost and uppermost positions of the arcuate path of the permanent magnet, the structure of the unit becomes more complicated to increase the production cost thereof.

SUMMARY OF THE INVENTION

It is therefore an object of the present invention to provide a manual input unit capable of transmitting data corresponding to the displacement of the actuator section, which can reduce the production cost, can be easily operated, and can reduce the number of malfunctions caused by vibration or a temperature change.

In accordance with the present invention, there is provided a manual input unit comprising an actuator section movably supported in a frame; a generator section associated with the actuator section, to output a voltage which corresponds to a movement of the actuator section on the frame; a signal transmission section associated with the generator section, to transmit a data signal, which corresponds to an output-voltage value of the generator section, to an external processing unit; the generator section including a switching means which is closed when the actuator section is in a reference position and is opened when the actuator section is apart from the reference position, and a generating means for generating a voltage linearly corresponding to a displacement of the actuator section from the reference position, the switching means and the generating means being connected in parallel to the signal transmission section; and the signal transmission section being provided for defining, on the basis of a voltage generated from the generating means at an instant when the actuator section departs from the reference position to open the switching means, a voltage subsequently generated by the generating means while the switching means is in an opened state as the output-voltage value of the generator section, and for selecting data corresponding to the defined output-voltage value from stored data in accordance with a predetermined relationship to transmit the selected data as the data signal.

It is advantageous that the signal transmission section calculates, as the output-voltage value of the generator section, the difference between a reference voltage generated by the generating means at an instant when the switching means is opened and a voltage subsequently generated from the generating means while the switching means is in an opened state.

It is preferred that the switching means of the generator section comprises a pair of electrodes, each being separately and electrically connected to the signal transmission section, and a short-circuit element arranged movably relative to the pair of electrodes to short the pair of electrodes with each other when the actuator section is in the reference position.

In this arrangement, the pair of electrodes may be fixedly joined to the frame, and the short-circuit element may be fixedly joined to the actuator section.

It is preferred that the signal transmission section comprises a circuit board fixedly secured to the frame, and an internal processing unit mounted onto the circuit board to define the output-voltage value of the generator section and selecting the data, and wherein the pair of electrodes are connected to the internal processing unit on the circuit board.

In this arrangement, the signal transmission section may further comprise a signal transmission element electrically connected to the internal processing unit to transmit the data signal to the external processing unit through radio-communication.

It is also preferred that the short-circuit element is made of a pressure-sensitive conductive rubber material.

It is also advantageous that the generating means of the generator section comprises a magnetoelectric element electrically connected to the signal transmission section, and a magnet arranged movably relative to the magnetoelectric element to make the magnetoelectric element generate a voltage which corresponds to a displacement of the magnet from the magnetoelectric element.

In this arrangement, the magnetoelectric element may be fixedly joined to the frame, and the magnet may be fixedly joined to the actuator section.

Also, in this arrangement, the signal transmission section may comprise a circuit board fixedly secured to the frame, and an internal processing unit mounted onto the circuit board, to define the output-voltage value of the generator section and selecting the data, and the magnetoelectric element may be connected to the internal processing unit on the circuit board.

It is preferred that the signal transmission section further comprises a signal transmission element electrically connected to the internal processing unit to transmit the data signal to the external processing unit through radio-communication.

In another preferred aspect, the actuator section may comprise at least one trigger movably attached to the frame, and both of the switching means and the generating means of the generator section may be provided in association with each of the triggers.

In this arrangement, the actuator section may comprise a spring interposed between the frame and the trigger to bias the trigger toward a start position.

The reference position of the actuator section may be the start position of the trigger.

Alternatively, the reference position of the actuator section may be an end position of the trigger.

It is further advantageous that the external processing unit includes a display and the actuator section includes at least two triggers, and that the signal transmission section selects plane coordinate data in the display in correspondence to two types of output-voltage values from the generating means associated with each of the triggers of the actuator section, to transmit a coordinates data signal to the external processing unit.

In further preferred aspect, the external processing unit may include a display and the signal transmission section may further include a light-receptive element for sensing a luminance of an image displayed on the display, and the signal transmission section may select plane coordinate data in the display in correspondence to a luminance signal of the light-receptive element, to transmit a coordinates data signal to the external processing unit.

BRIEF DESCRIPTION OF THE DRAWINGS

The above and other objects, features, and advantages of the present invention will become more apparent from the following description of preferred embodiments in connection with the accompanying drawings, in which:

FIG. 10 is a vertical sectional view of a conventional manual input unit;

DESCRIPTION OF THE PREFERRED EMBODIMENT

Figure 1:
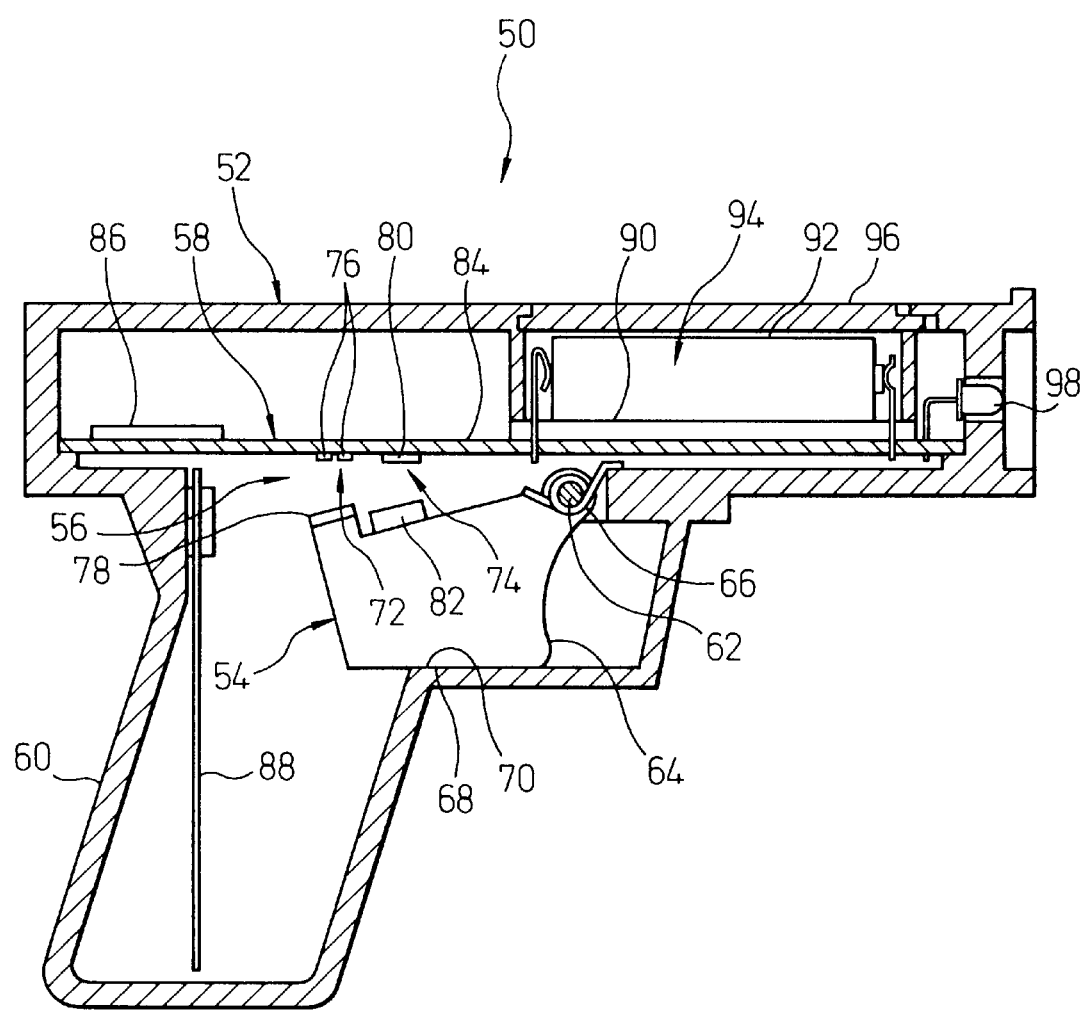
FIG. 1 is a vertical sectional view showing a first embodiment of a manual input unit according to the present invention.
Figure 9:
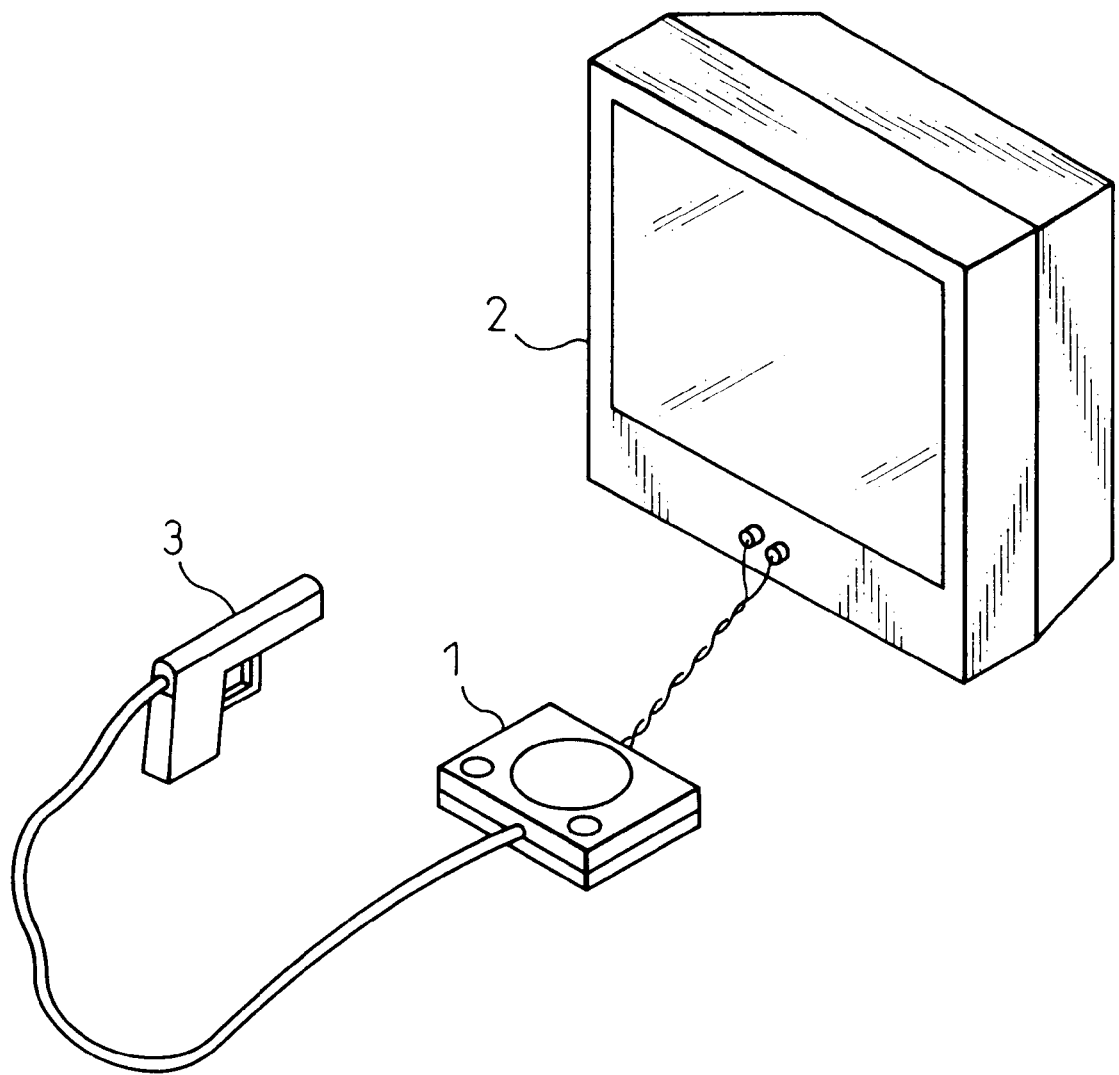
FIG. 9 is a perspective view of an amusement computer system of a general type.
Figure 11A:
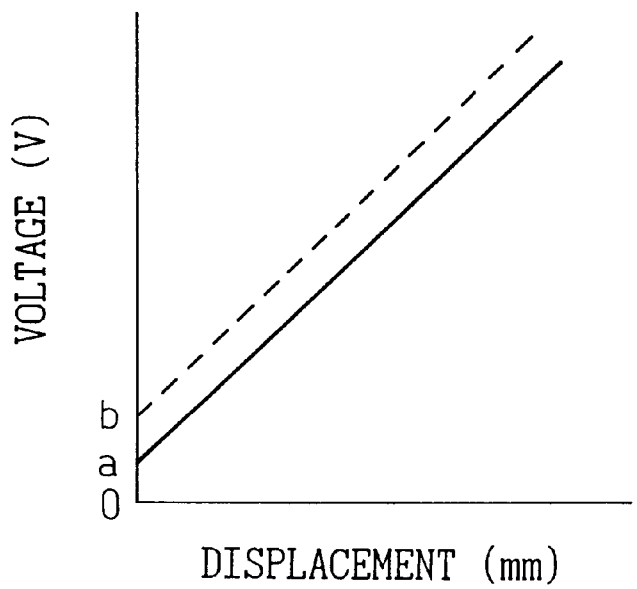
FIG. 11A illustrates characteristic curves showing the relationship between an output voltage of a magnetoelectric element and a displacement of a trigger in the conventional input unit.
Figure 11B:
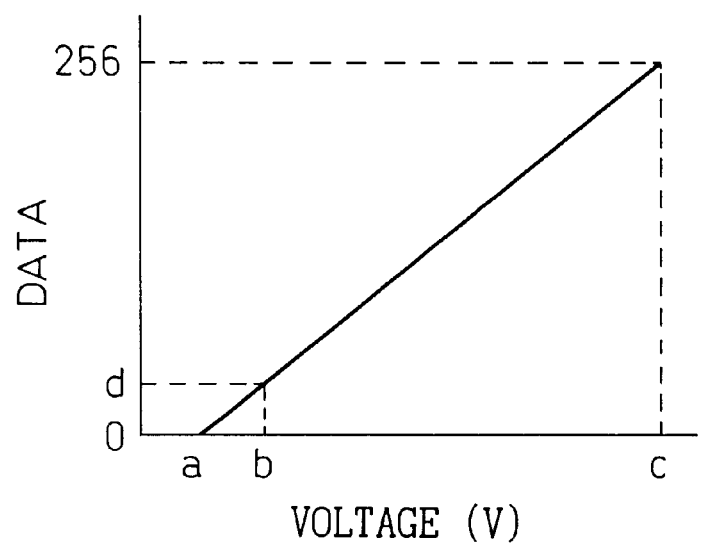
FIG. 11B illustrates a characteristic curve showing the relationship between a data to be selected and an entered output-voltage value in a CPU in the conventional input unit.

Referring now to the drawings, in which the same or similar components are denoted by the same reference numerals, FIG. 1 shows in a vertical section a first embodiment of a manual input unit 50 in accordance with the present invention. The manual input unit 50 includes a pistol-shaped frame 52, an actuator section 54 movably supported in the frame 52, a generator section 56 associated with the actuator section 54 to output a voltage which corresponds to a movement of the actuator section 54 on the frame 52, and a signal transmission section 58 associated with the generator section 56 to select data from a number of stored data corresponding to the output-voltage value of the generator section 56 and to transmit a data signal to an external processing unit, such as a computer 1 shown in FIG. 9. The frame 52 is provided with a grip 60 which can be grasped by an operator with one or both hands, and is preferably molded from a resinous material with a high mechanical strength.

The actuator section 54 includes a trigger 64 pivotably supported at one end thereof by a pin 62 disposed near the grip 60 on the inner wall face of the frame 52, and a torsion coil spring 66 disposed around the pin 62 and interposed between the frame 52 and the trigger 64 to bias the trigger 64 toward a start position as illustrated. In the start position, a stopper 68 formed along the lower edge of the trigger 64 is abutted onto the inner wall face of the grip 60 to inhibit the further rotation of the trigger. In this position, a part of the trigger projects outward through an opening 70 formed near the grip 60.

The torsion coil spring 66 is, even if it has a small size, generally capable of more easily increasing a spring force thereof than a compression coil spring, and thus a force for biasing the trigger 64 toward the start position in the input unit 50 is increased in comparison to a structure using the compression coil spring as means for biasing the trigger. Therefore, the trigger 64 is effectively prevented from moving due to the vibration applied to the unit during the operation thereof. However, the present invention should not be limited thereto but may use any other type of springs.

The generator section 56 includes a switching means 72 which is closed when the trigger 64 of the actuator section 54 is in a reference position (FIG. 2A) and is opened when the trigger 64 is moved away from the reference position (FIG. 2B), and a generating means 74 for generating a voltage linearly corresponding to the displacement of the trigger 64 from the reference position. Both the switching means 72 and the generating means 74 are connected, in parallel, to the signal transmission section 58 (FIG. 3A).

The switching means 72 of the generator section 56 includes a pair of electrodes 76 separately and electrically connected to the signal transmission section 58, and a short-circuit element 78, arranged movably relative to the electrodes 76, to be able to contact the electrodes 76 and short them together when the trigger 64 of the actuator section 54 occupies the reference position. In the illustrated embodiment, the pair of electrodes 76 is fixedly joined to the frame 52, and the sort-circuit element 78 is fixedly joined to the other end of the trigger 64 away from the pin 62.

The short-circuit element 78 is preferably made of a pressure-sensitive conductive rubber material which is bonded to the trigger 64 by a well-known method such as an adhesive or welding. The pressure-sensitive conductive rubber material is effective for mitigating a shock applied to the operator from trigger 64 when the short-circuit element 78 is brought into contact with the electrodes 78, and for reducing noise upon contact. However, the present invention is not limited to such a rubber material but may use any other conductive material.

The generating means 74 of the generator section 56 includes one magnetoelectric element 80 electrically connected to the signal transmission section 58, and a permanent magnet 82 arranged to be movable relative to the magnetoelectric element 80 to make the magnetoelectric element 80 generate a voltage which linearly corresponds to a displacement of the magnet 82 from the magnetoelectric element 80. In the illustrated embodiment, the magnetoelectric element 80 is fixedly joined to the frame 52, and the permanent magnet 82 is fixedly joined to the trigger 64 near the short-circuit element 78. The magnetoelectric element 80 is made of, e.g., a Hall element. The permanent magnet 82 is bonded to the trigger 64 by a well-known method such as an adhesive.

The signal transmission section 58 includes a printed circuit board 84 fixedly secured to the barrel-shaped portion of the frame 52, and a CPU 86 mounted onto the printed circuit board 84 and used as an internal processing unit. The magnetoelectric element 80 of the generator section 56 is connected to the input side of the CPU 86. The CPU 86 receives an output voltage from the magnetoelectric element 80 and selects or retrieves data corresponding to the output voltage from a number of stored data, to transmit the selected data as a digital data signal.

The signal transmission section 58 further includes an antenna 88 connected to the output side of the CPU 86 and used as a signal transmission element for transmitting the data signal fed from the CPU 86 to the external processing unit such as a computer 1 by radio-communication. The antenna 88 facilitates the handling of the manual input unit 50 in comparison with a structure using the coupling cable 30 (FIG. 10) for transmitting the output data signal. Preferably, the antenna 88 is accommodated inside the grip 60 of the frame 52 as illustrated, which further improves the operability and the portability of the input unit. Of course, the radio communication by the antenna 88 or the like is not indispensable and a coupling cable may be used in the same manner as in the structure shown in FIG. 10.

When the antenna 88 is used in place of the coupling cable, a power source section 94 including a socket 90 and a battery 92 is preferably mounted onto the printed circuit board 84 and is accommodated in the barrel-shaped portion of the frame 52. In this case, a detachable cover 96 may be advantageously provided in the upper wall of the barrel-shaped portion of the frame 52 to facilitate the replacement of the battery 92 which has been consumed.

Figure 3A:
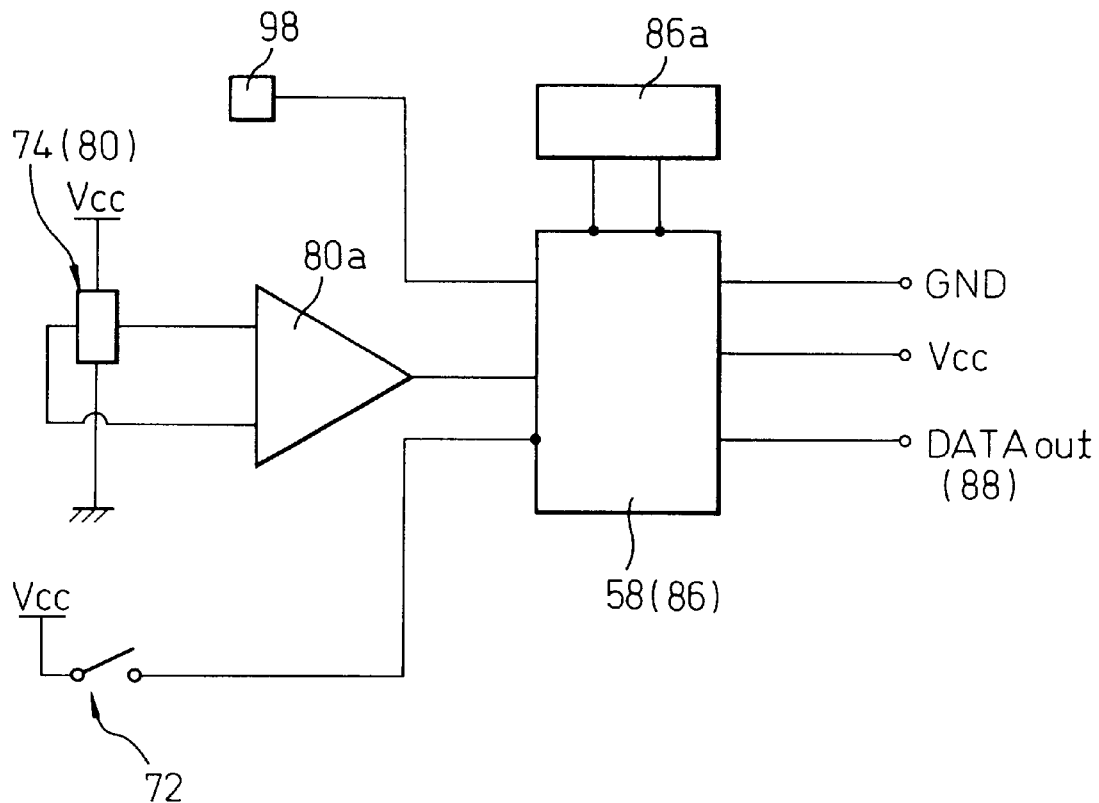
FIG. 3A illustrates an equivalent circuit, provided on a printed circuit board, and used in the manual input unit of FIG. 1.
Figure 3B:
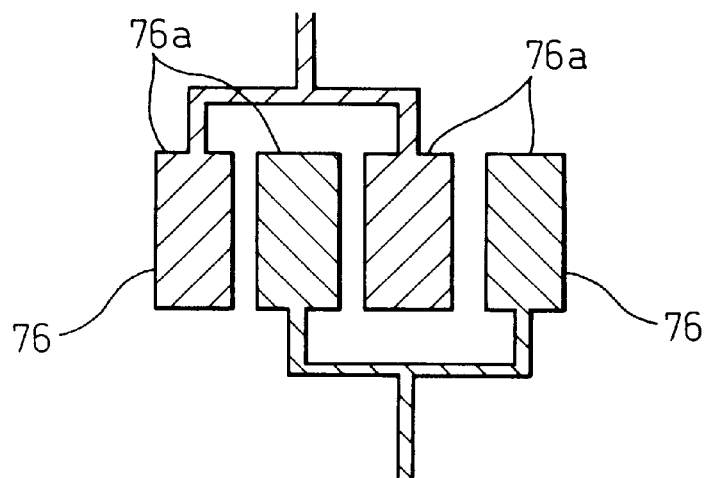
FIG. 3B is a partially enlarged plan view of one preferred structure of electrodes used in the manual input unit of FIG. 1.

In the illustrated embodiment, both the electrodes 76 of the switching means 72 and the magnetoelectric element 80 of the generating means 74 of the generator section 56 are mounted onto the printed circuit board 84 and are electrically connected to the CPU 86. A light-receptive element 98 such as a photodiode or a phototransistor may be also mounted to the printed circuit board 84 to be positioned at a muzzle-shaped portion of the frame 52, and may be electrically connected to the CPU 86. FIG. 3A shows an equivalent circuit including these parts on the printed circuit board 84. In FIG. 3A, an amplifier 80a and a clock 86a are additionally illustrated. Also, as shown in FIG. 3B, each of the electrodes 76 may be formed by two terminal plates 76a which are alternately placed side by side. This arrangement reduces poor electrical contact because the short-circuit element 78 comes into contact with the electrodes 76 in a tilted state.

The light-receptive element 98 is capable of sensing the difference of luminance in an image displayed on a specified position in the screen of the display 2 (FIG. 9) when the muzzle-shaped portion of the frame 52 is directed in the specified position. In this case, the CPU 86 may receive an luminance signal from the light-receptive element 98, then select planar coordinate data corresponding to the luminance signal from a number of stored planar coordinate data, and transmit a two-dimensional coordinate data signal to the external processing unit through the antenna 88.

A process for operating the manual input unit 50 of the above structure will be described below.

The operator grasps the grip 60 with one hand in the same way as operating a pistol, and squeezes the trigger 64 by a finger (e.g., a forefinger) put on the part of the trigger 64 projecting from the opening 70. Thereby, the trigger 64 rotates about the pin 62 from the start position shown in FIG. 1 in a clockwise direction as seen in the drawing. Simultaneously, the short-circuit element 78 and the permanent magnet 82, both secured to the rear end of the trigger 64, are shifted upward in the drawing from the lowermost position as illustrated along an arcuate path about the pin 62.

Figure 2A:
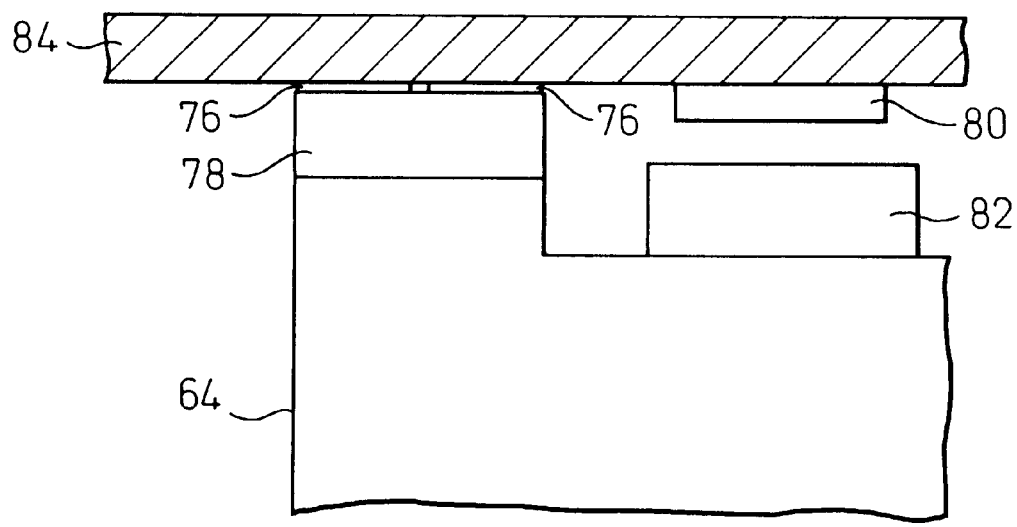
FIG. 2A is a partially enlarged vertical sectional view of the manual input unit of FIG. 1, showing a switching means and a generating means in a closed state of the switching means.
Figure 2B:
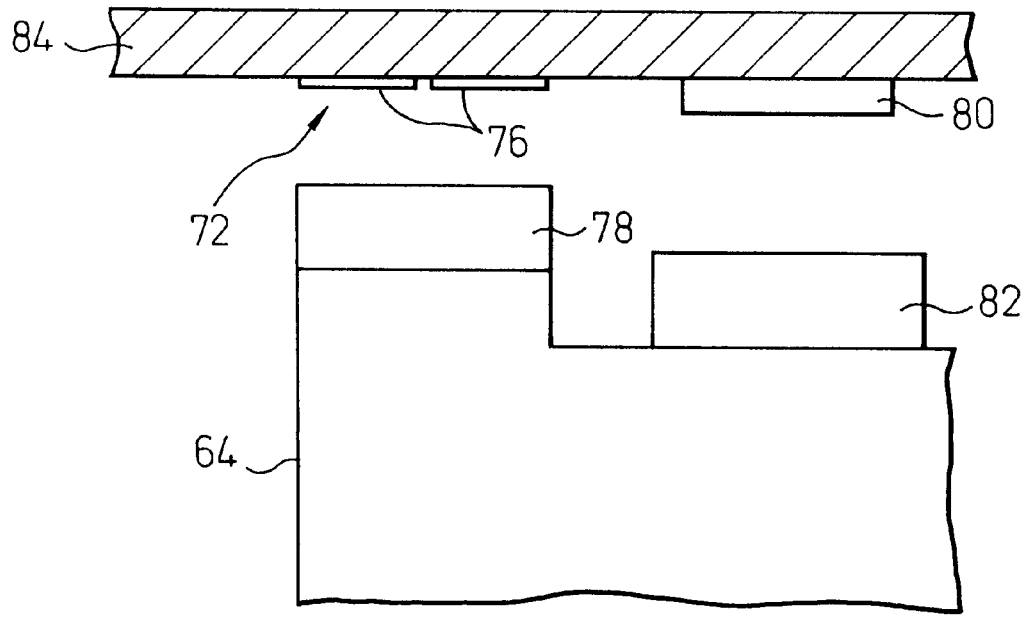
FIG. 2B is a view similar to FIG. 2A, showing in an opened state of the switching means.

When the trigger 64 is fully squeezed to reach an end position of the movement, the short-circuit element 78 is brought into contact with the pair of electrodes 76 on the printed circuit board 84 as shown in FIG. 2A, to short the electrodes 76 to each other as described. In this embodiment, the end position of the trigger 64 is defined as the reference position of the actuator section 54. In this position, the permanent magnet 82 confronts, but is spaced from, the magnetoelectric element 80 on the printed circuit board 84 with the smallest gap being defined therebetween. As a result, the maximum voltage is generated from the magnetoelectric element 80.

When the operator releases the trigger 64 from the finger, the trigger 64 rotates in the counterclockwise direction in the drawing by the biasing force of the torsion coil spring 66 from the reference position toward the start position, and simultaneously the short-circuit element 78 is disengaged from the pair of electrodes 76 and moves downward in the drawing. When the trigger 64 is restored to the start position, the permanent magnet 82 is in a position farthest from the magnetoelectric element 80 in the arcuate path of the magnet, and consequently, the minimum voltage is generated from the magnetoelectric element 80. While the trigger 64 freely moves between the reference position and the start position depending on the torque applied by the finger of the operator, the magnetoelectric element 80 generates a voltage which decreases in linear correspondence with the increase in distance between the element 80 and the magnet 82. Such an analog output voltage generated by the magnetoelectric element 80 is converted to a digital signal which in turn is passed to the CPU 86.

Figure 4A:
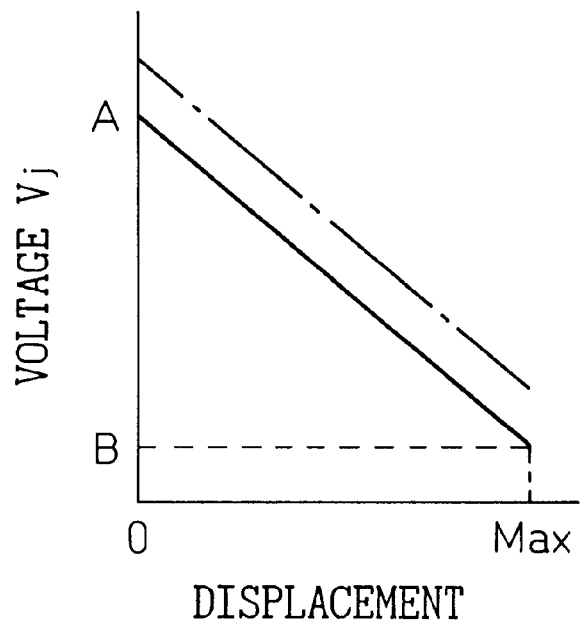
FIG. 4A illustrates characteristic curves showing the relationship between an output voltage of a generating means and a displacement of a trigger in the manual input unit of FIG. 1.

The CPU 86 of the signal transmission section 58 receives an open signal, from the electrodes 76, at the instant when the trigger 64 moves from the reference position to disengage the short-circuit element 78 from the electrodes 76 after the trigger 64 has once reached the reference position to short the electrodes 76 with each other by the short-circuit element 78. As seen from a characteristic curve shown as an example in FIG. 4A, the CPU 86 is programmed to calculate a reference output-voltage value "0" on the basis of a reference voltage ($V_0$) which is defined by a voltage "A" (i.e., substantially a maximum voltage; FIG. 4A) generated by the magnetoelectric element 80 at the instant when receiving the open signal, and to then select a reference data "0" (FIG. 4B) corresponding to the reference output-voltage value "0".

Figure 4B:
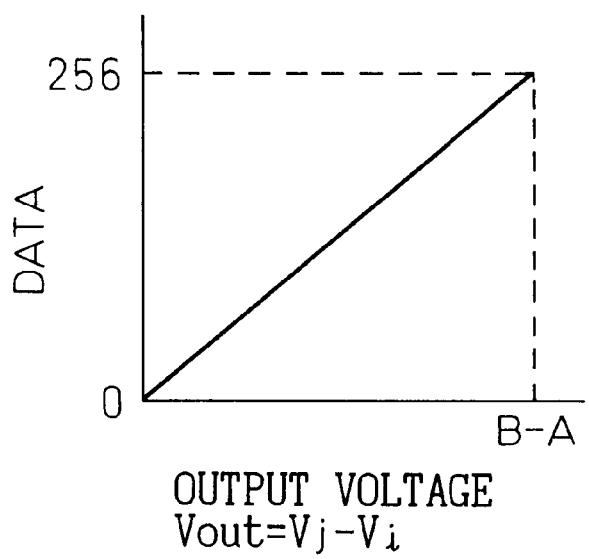
FIG. 4B illustrates characteristic curves showing the relationship between a data to be selected and an entered output-voltage value in a CPU in the manual input unit of FIG. 1.

After that, while the trigger 64 moves between the reference position (displacement=0) and the start position (displacement=Max) and the pair of electrodes 76 are kept in the opened state, a voltage $V_j$ generated by the magnetoelectric element 80 linearly corresponding to the distance from the permanent magnet 82 is passed to the CPU 86 and is calculated therein to produce an output-voltage value $V_{out}$ of the generator section 56 ($V_{out}=V_j-V_0$). The CPU 86 then selects a data corresponding to the output-voltage value $V_{out}$ on the basis of a predetermined relationship (FIG. 4B). In such a manner, the data selected in correspondence with the displacement of the trigger 64 from the reference position is output from the CPU 86 as a data signal, and then the data signal is transmitted to the external processing unit via the antenna 88. In the exemplary characteristic curves shown in FIGS. 4A and 4B, a minimum voltage "B" is generated from the magnetoelectric element 80 when the trigger 64 is restored to the start position, and then a data 256 corresponding to the output-voltage value $V_{out}=B-A$ is selected in the CPU 86 and is transmitted as a data signal.

According to this arrangement, even if the output voltage characteristic of the magnetoelectric element 80 has been varied due to an environmental temperature change, it is possible to initialize the output-voltage value of the magnetoelectric element 80 by the CPU 86 to which the open signal is entered from the electrodes 76, which is caused by manual operations that the operator first fully squeeze the trigger 64 upto the reference position, and then releases a finger force applied to the trigger 64 to move the trigger 64 from the reference position to the start position. In this respect, the relationship between the output-voltage value and the data (e.g., FIG. 4B) is predetermined in the CPU 86 on the basis of a voltage/displacement characteristic curve (e.g., shown by a solid line in FIG. 4A) of the output voltage generated from the magnetoelectric element 80 in a certain range of normal temperature. Then, even if the output voltage characteristic of the magnetoelectric element 80 is varied due to the environmental temperature out of the normal temperature range to exhibit a shifted voltage/displacement characteristic curve (e.g., shown by a chain line in FIG. 4A), it is possible to use the above-mentioned predetermined relationship between the output-voltage value and the data as it is, by cancelling the voltage variation through the initializing steps so that the shifted voltage/displacement characteristic curve is identified with the basic voltage/displacement characteristic curve.

Figure 5:
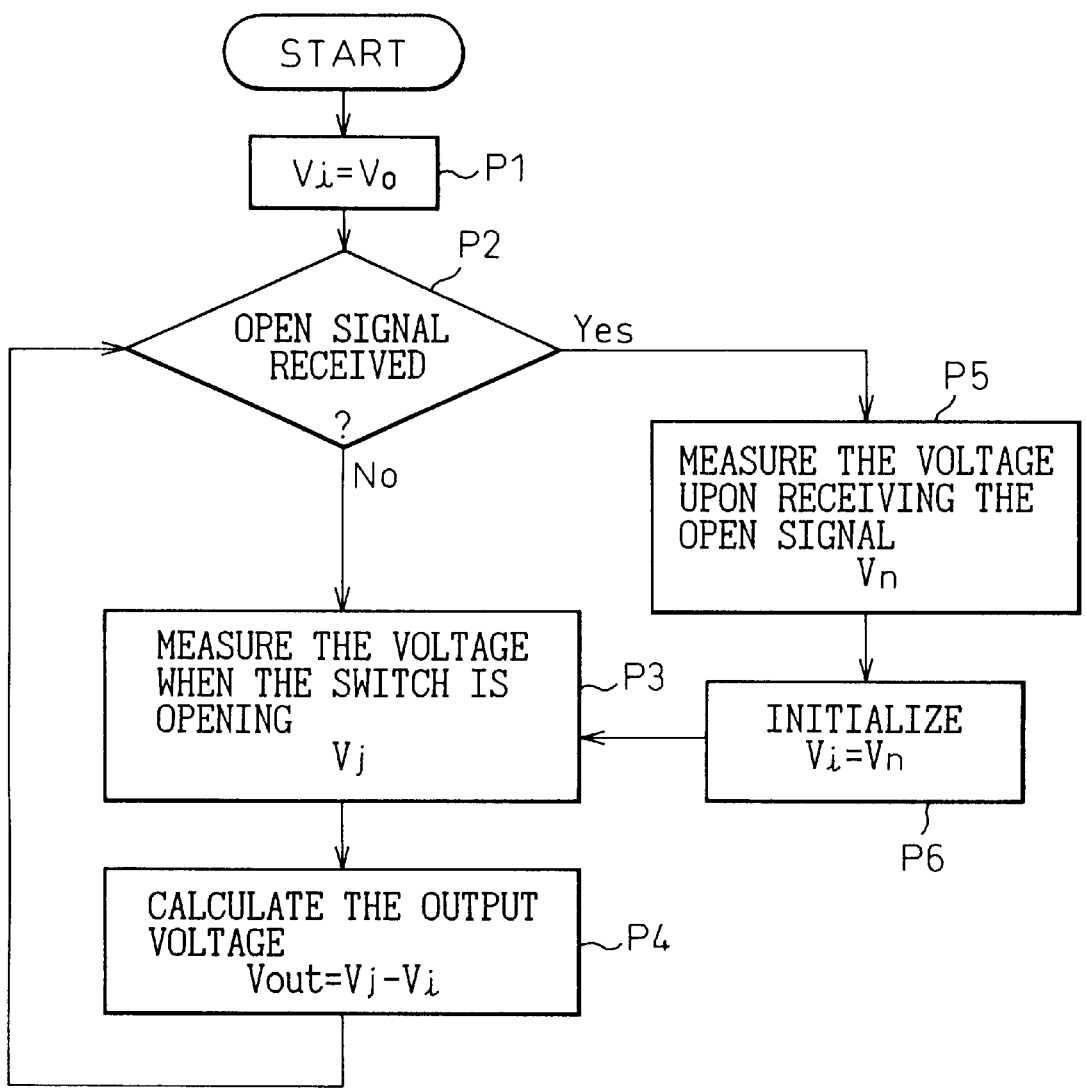
FIG. 5 is a flow chart showing initializing steps in the manual input unit of FIG. 1.

The steps for initializing the output-voltage value carried out in CPU 86 will be described in more detail below with reference to a flow chart shown in FIG. 5. In step P1, a voltage $V_i=V_0$ is stored, which is generated from the magnetoelectric element 80 when the trigger 64 is in the reference position. In step P2, it is decided whether or not the open signal is received from the switching means 72. If the decision is that the open signal is not received, the voltage $V_j$ generated from the magnetoelectric element 80, which linearly corresponds to the distance from the permanent magnet 82, is measured in step P3, and then the output-voltage value $V_{out}=V_j-V_i$ is calculated in step P4. The calculated output-voltage value $V_{out}$ is used for selecting the data.

If the decision in step P2 is that the open signal is received, the voltage $V_n$ generated from the magnetoelectric element 80 at the instant when the open signal is received, in step P5, and then the voltage $V_i$ of the magnetoelectric element 80 when the trigger 64 is in the reference position is initialized as $V_i=V_n$ which in turn is stored, in step P6. Thereafter, the voltage $V_j$ generated from the magnetoelectric element 80, which linearly corresponds to the distance from the permanent magnet 82, is measured in step P3 and then the output-voltage value $V_{out}=V_j-V_i=V_j-V_n$ is calculated in step P4. After step P4, the routine returns to step P2, and the decision step is repeated to decide whether or not the open signal is received from the switching means 72.

In this manner, even if the reference voltage $V_0$ is shifted to $V_n$ due to the environmental temperature change, the CPU 86 is able to calculate the output-voltage value $V_{out}$ of which the voltage variation has been cancelled, by subtracting the voltage $V_n$ containing the variation from the voltage $V_j$ generated from the magnetoelectric element 80 on the basis of the shifted voltage/displacement characteristic curve, during the interval from the preceding reception of the open signal to the next reception thereof. Thereby, it is possible to select a data corresponding to the output-voltage value $V_{out}$ on the basis of the predetermined relationship defined in the certain range of normal temperature, in the same manner as in a case wherein there is no environmental temperature change. As a result, it is possible to output the data which correctly corresponds to the displacement of the trigger 64 from the reference position without being affected by the environmental temperature change.

As described above, the manual input unit 50 is able to transmit the data signal which correctly corresponds to the displacement of the trigger 64, while the data selection in the CPU 86 is not affected by the environmental temperature change. As a result, the external processing unit such as a computer 1 operates correctly according to the commands from the manual input unit 50. The manual input unit 50 is simple in structure and inexpensive in production cost, since it uses only one relatively expensive magnetoelectric element 80, while the inexpensive electrodes 76 and short-circuit element 78 are solely added as means for eliminating the effect due to the environmental temperature change, and also the magnetoelectric element 80, the electrodes 76 and the CPU 86 are mounted intensively onto a single printed circuit board 84. Thus, according to this embodiment, a manual input unit 50 is provided which can reduce the production cost thereof and can decrease the number of malfunctions due to vibration or a temperature change.

There might be a slight inconvenience in the manual input unit 50 in that the operator must fully squeeze the trigger 64 to locate the same in the reference position for the purpose of initializing the output voltage of the generator section 56, which is essentially irrespective of the game operation. Accordingly, it may be an advantage to program the CPU 86 so that the initialization is carried out when a predetermined time has passed after the preceding initialization during the operation of the input unit, even though the open signal is not received from the switching means 72.

Further, in the manual input unit 50, the data signals transmitted in correspondence with the displacement of the trigger 64 are those relating to a one-dimensional parameter, such as a beam magnitude for a laser gun or a car speed in the game. On the other hand, when the manual input unit 50 is provided with the light-receptive element 98 as described, it is possible to transmit two-dimensional coordinate data signals to the computer 1 through the following steps. That is, when the muzzle-shaped portion of the frame 52 is pointed to a certain position in a screen of the display 2, as shown, e.g., in FIG. 6, the light-receptive element 98 senses the difference in luminance of an image displayed on that position in the screen, then the CPU 86 selects planar coordinate data which corresponds to the luminance signal received from the light-receptive element 98, whereby a planar coordinate data signal is transmitted. In this case, the manual input unit 50 also functions as a pointing device.

Figure 6:
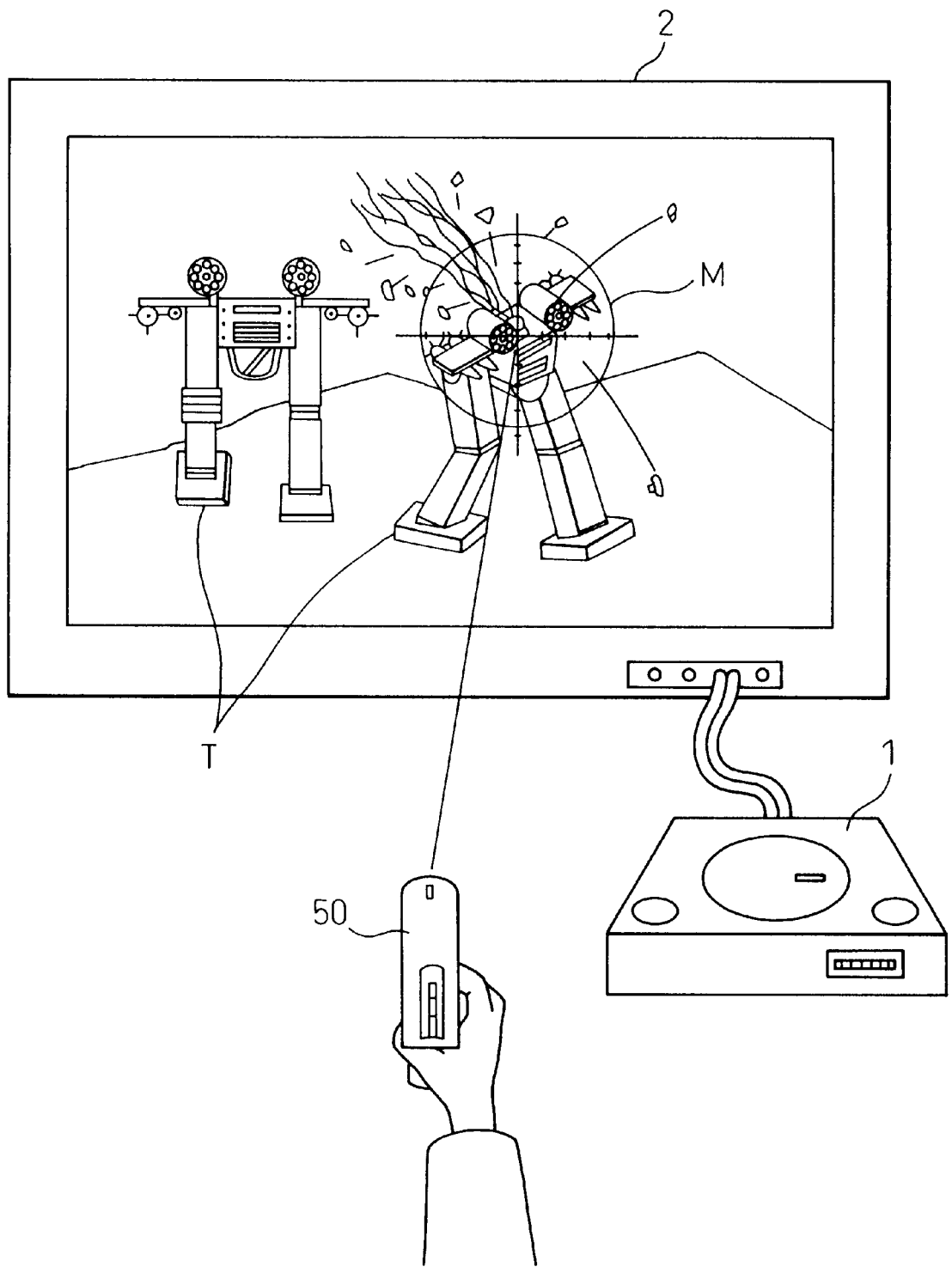
FIG. 6 illustrates one exemplary application for the manual input unit of FIG. 1.

In the embodiment shown in FIG. 6, the manual input unit 50 senses a target mark M displayed on a screen of the display 2 on the basis of the difference in luminance between the mark M and the image surrounding the mark, and transmits the coordinates data signal corresponding to a position of the target mark M in the screen to the computer 1. If it is decided that the target mark M is overlapped with an object T, the object T is variously changed, such as destroyed, in accordance with the displacement of the trigger 64, i.e., the beam magnitude of a laser gun. It is also possible to arrange a program to move and put the target mark M at a position to which the muzzle-shaped portion of the manual input unit 50 is pointed.

Figure 7:
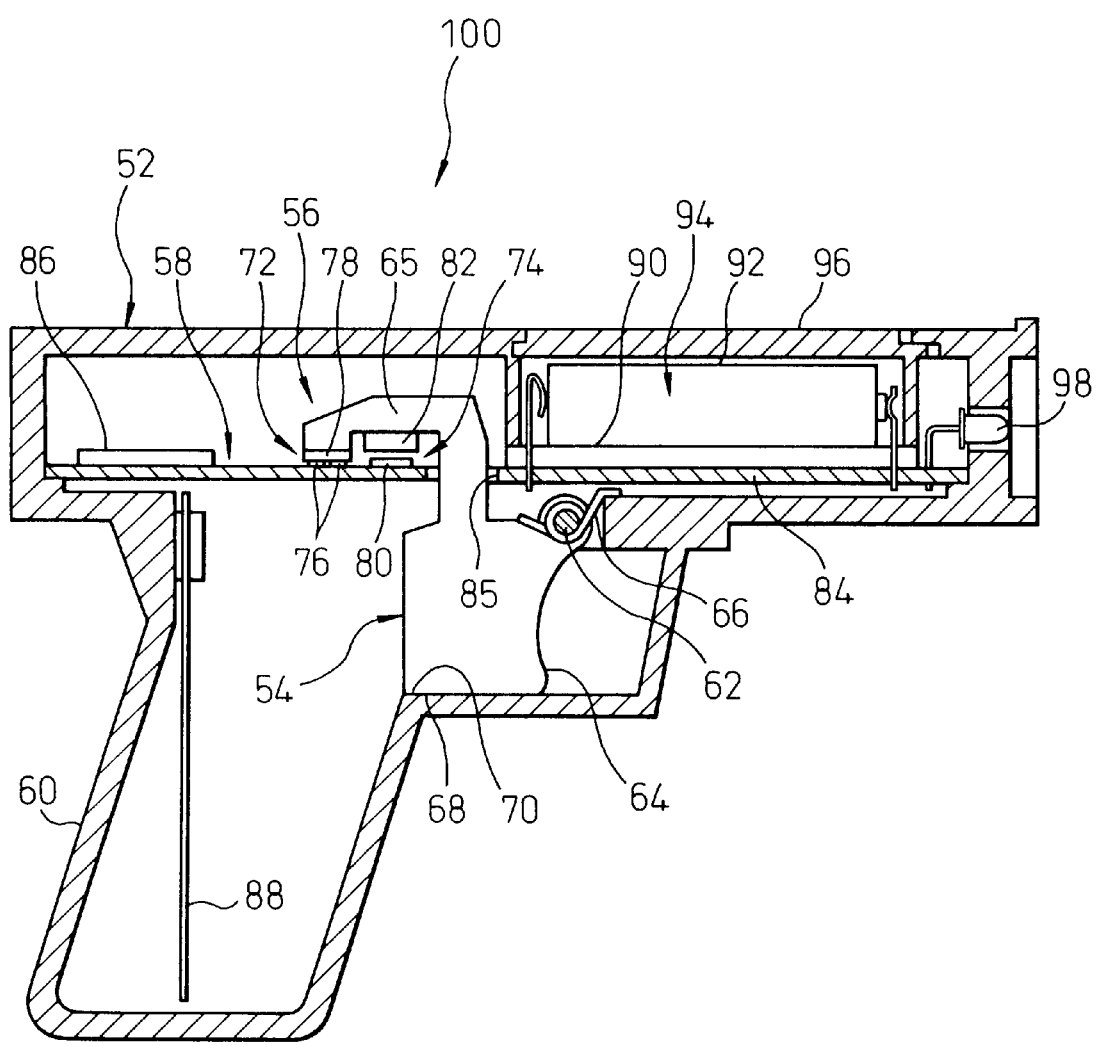
FIG. 7 is a vertical sectional view showing a second embodiment of a manual input unit according to the present invention.

FIG. 7 shows in vertical section a second embodiment of a manual input unit 100 according to the present invention. The manual input unit 100 has essentially identical features to those of the manual input unit 50 of the first embodiment, except for a shape of a trigger 64 of an actuator section 54 and the arrangement of a switching means 72 and a generating means 74 of a generator section 56, as described below. Hence, a detailed description of the identical features will not be repeated.

The actuator section 54 of the manual input unit 100 includes a trigger 64 pivotably supported at one end thereof by a pin 62 disposed near a grip 60 on the inner wall face of a frame 52, and a torsion coil spring 66 disposed around the pin 62 and interposed between the frame 52 and the trigger 64 to bias the trigger 64 toward a start position as illustrated. In the start position, a stopper 68 formed along the lower edge of the trigger 64 is abutted onto the inner wall face of the grip 60 to inhibit the further rotation of the trigger.

The trigger 64 has an extension 65 extending upward and rearward in the frame 52 through a hole 85 provided in a printed circuit board 84 fixed to the barrel-shaped portion of the frame. A short-circuit element 78 of a switching means 72 and a permanent magnet 82 of a generating means 74 of a generator section 56 are fixed to the lower surface of a rear end portion of the extension 65 of the trigger 64, and are arranged to be capable of confronting the upper surface of the printed circuit board 84. A pair of electrodes 76 of the switching means 72 and a magnetoelectric element 80 of the generating means 74 are mounted on the upper surface of the printed circuit board 84 at the respective positions capable of confronting the short-circuit element 78 and the permanent magnet 82.

In the manual input unit 100, when the unit is not used, i.e., the trigger 64 is in the start position, the short-circuit element 78 fixed at the rear end of the extension 65 of the trigger 64 comes into contact with the pair of electrodes 76 on the printed circuit board 84 to short them together, as shown in FIG. 7. Thus, in the second embodiment, the start position of the trigger 64 is defined as the reference position of the actuator section 54. In this position, the permanent magnet 82 fixed to the extension 65 confronts, but is spaced from, the magnetoelectric element 80 on the printed circuit board 84 with the smallest gap being defined therebetween. As a result, the maximum voltage is generated from the magnetoelectric element 80.

When the operator squeezes the trigger 64 with a finger, the trigger 64 rotates about the pin 62 from the start or reference position shown in FIG. 7 in a clockwise direction as seen in the drawing. Simultaneously, the short-circuit element 78 is disengaged from the pair of electrodes 76, and moves together with the permanent magnet 82 upward in the drawing from the illustrated lowermost position along an arcuate path about the pin 62. When the trigger 64 is fully squeezed to reach an end position, the permanent magnet 82 is in a farthest position from the magnetoelectric element 80 in the arcuate path of the magnet, and consequently, the minimum voltage is generated from the magnetoelectric element 80.

After that, when the operator releases the trigger 64 from the finger, the trigger 64 rotates in a counterclockwise direction in the drawing by the biasing force of the torsion coil spring 66 from the end position toward the reference position. While the trigger 64 freely moves between the reference position and the end position depending on a force applied by the finger of the operator, the magnetoelectric element 80 generates a voltage which decreases in linear correspondence with the increase in distance between the element 80 and the magnet 82. Such an analog output voltage generated by the magnetoelectric element 80 is converted to a digital signal which in turn is entered into the CPU 86.

In the same manner as the CPU 86 in the manual input unit 50 of the first embodiment, the CPU 86 of the signal transmission section 58 receives an open signal from the electrodes 76, at the instant when the trigger 64 moves from the reference position to disengage the short-circuit element 78 from the electrodes 76. The CPU 86 is programmed to calculate a reference output-voltage value "0" on the basis of a reference voltage ($V_0$) which is defined by a voltage "A" (FIG. 4A) generated by the magnetoelectric element 80 at the instant when receiving the open signal, and to then select a reference data "0" (FIG. 4B) corresponding to the reference output-voltage value "0".

After that, while the trigger 64 moves between the reference position (displacement=0) and the end position (displacement=Max) and the pair of electrodes 76 are kept in an opened state, a voltage $V_j$ generated from the magnetoelectric element 80 linearly corresponding to the distance from the permanent magnet 82 is passed to the CPU 86 and is calculated therein into an output-voltage value $V_{out}$ of the generator section 56 (i.e., $V_{out}=V_j-V_0$). The CPU 86 then selects a data corresponding to the output-voltage value $V_{out}$ on the basis of a predetermined relationship (FIG. 4B). In this manner, the data selected in correspondence to the displacement of the trigger 64 from the reference position is output from the CPU 86 as a data signal, and then the data signal is transmitted to the external processing unit via an antenna 88.

According to the above structure, even if the output voltage characteristic of the magnetoelectric element 80 has varied due to an environmental temperature change, it is possible to initialize the output-voltage value of the magnetoelectric element 80 by the CPU 86 to which the open signal is entered from the electrodes 76, through the same steps as described with reference to the manual input unit 50, but which is caused by a different manual operation in that the operator merely starts the operation of the manual input unit 100 by squeezing the trigger 64 to displace the same from the reference position to the end position. Further, the manual input unit 100 has an advantage that, since the start position of the trigger 64 coincides with the reference position of the actuator section 54, it is unnecessary to force the operator to fully squeeze the trigger 64 to locate the same at the reference position for initializing the output voltage of the generator section 56 as in the manual input unit 50, which operation is irrespective of the proper operation for, e.g., a game.

Figure 8:
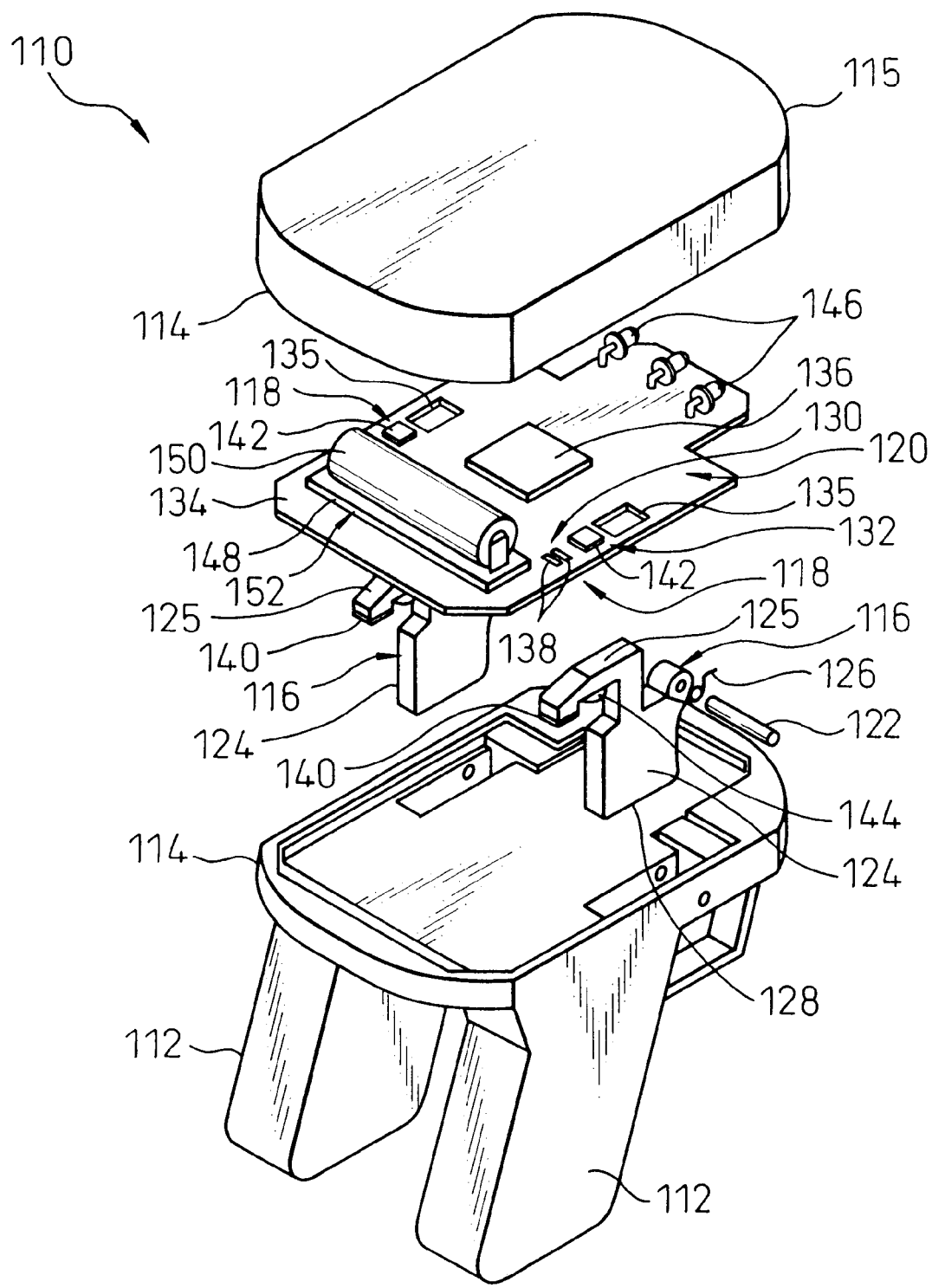
FIG. 8 is an exploded perspective view showing a third embodiment of a manual input unit according to the present invention.

FIG. 8 shows in an exploded perspective view a third embodiment of a manual input unit 110 according to the present invention. The manual input unit 110 includes a pistol-shaped frame 114 having a pair of grips 112 to be grasped by the operator, a pair of actuator sections 116 movably supported in the frame 114, a pair of generator sections 118 associated with the respective actuator sections 116 to output a voltage which corresponds to a movement of the actuator sections on the frame 114, and a signal transmission section 120 associated with the respective generator sections 118 to select data from stored data corresponding to the output-voltage value of the generator section 118 and to transmit a data signal into an external processing unit, such as a computer 1 shown in FIG. 6.

Each of the actuator sections 116 includes a trigger 124 pivotably supported at one end thereof by a pin 122 disposed near the grip 124 on the inner wall face of the frame 114, and a torsion coil spring 126 disposed around the pin 112 and interposed between the frame 114 and the trigger 124 to bias the trigger 124 toward a start position. In the start position, a stopper 128 formed along the lower edge of the trigger 124 is abutted onto the inner wall face of the grip 112 to inhibit the further rotation of the trigger 124. In this position, a part of the trigger projects outward through an opening formed near the grip 112.

Each of the generator sections 118 includes a switching means 130 which is closed when the trigger 124 is in a start or reference position and is opened when the trigger 124 is moved away from the reference position, and a generating means 132 for generating a voltage linearly corresponding to the displacement of the trigger 124 from the reference position. Both the switching means 130 and the generating means 132 are connected, in parallel with each other, to the signal transmission section 120.

The signal transmission section 120 includes a printed circuit board 134 fixedly secured to the barrel-shaped portion of the frame 114, and the CPU 136 mounted onto the printed circuit board 134 and used as an internal processing unit. Each of the triggers 124 has an extension 125 extending upward and rearward in the frame 52 through each of a pair of through-holes 135 formed in the printed circuit board 134.

The switching means 130 of each generator section 118 includes a pair of electrodes 138 separately and electrically connected to the CPU 136 of the signal transmission section 120, and a short-circuit element 140 arranged movably relative to these electrodes 138 to be able to contact with the electrodes 138 and short them together when the trigger 124 occupies the reference position. The short-circuit element 140 is preferably made of pressure-sensitive conductive rubber material.

The generating means 132 of each generator section 118 includes one magnetoelectric element 142 electrically connected to the CPU 136 of the signal transmission section 120, and a permanent magnet 144 arranged to be movable relative to the magnetoelectric element 142 to make the magnetoelectric element 142 generate a voltage linearly corresponding to a displacement of the magnet 144 from magnetoelectric element 142. The magnetoelectric element 142 is made of, e.g., a Hall element.

The short-circuit element 140 of each switching means 130 and the permanent magnet 144 of each generating means 132 are fixed to the lower surface of a rear end portion of the extension 125 of each trigger 124, and are arranged to be capable of confronting the upper surface of the printed circuit board 134. The pair of electrodes 138 of each switching means 130 and the magnetoelectric element 142 of each generating means 132 are mounted on the upper surface of the printed circuit board 134 at the respective positions capable of confronting the short-circuit element 140 and the permanent magnet 144. The magnetoelectric element 142 is connected to the input side of the CPU 136 on the printed circuit board 134. The CPU 136 receives the output voltage from the magnetoelectric element 142 and selects data corresponding to the output voltage from stored data, the selected data being in turn output as a digital data signal.

As described above, each actuator section 116 and each generator section 118 have substantially the same arrangements as those of the actuator section 54 and the generator section 56 in the manual input unit 100 according to the second embodiment. However, substantially the same arrangements as those of the actuator section 54 and the generator section 56 of the manual input unit 50 in the first embodiment may be adopted in the manual input unit 110. That is, the pair of electrodes 138 and the magnetoelectric element 142 may be mounted onto the lower surface of the printed circuit board 134, and the reference position of the actuator section 54 may be defined by the end position of the trigger 64.

The signal transmission section 120 further includes an infrared generator 146 connected to the output side of the CPU 136 and used as a signal transmission element for transmitting the data signal fed from the CPU 136 to an external processing unit such as a computer 1 (FIG. 6) by a radio-communication. The infrared generator 146 is mounted onto the printed circuit board 134 to be arranged in a muzzle-shaped portion of the frame 114, and transmits the data signal as a converted infrared ray passing through a window 115 provided in the muzzle-shaped portion. A power source section 152 including a socket 148 and a battery 150 is also mounted to the printed circuit board 134. According to this arrangement, it is possible to improve the operability and the portability of the manual input unit 110 as in the case where the antenna 88 is used. Of course, the antenna 88 or the coupling cable 39 (FIG. 10) may be used in place of the infrared generator 146.

In the manual input unit 110, in the same manner as the manual input unit 100 of the second embodiment, when the unit is not used, i.e., the trigger 124 is in the start position, the short-circuit element 140 fixed at the rear end of the extension 125 of each trigger 124 comes into contact with the corresponding pair of electrodes 138 on the printed circuit board 134 to short them together. Thus, in the third embodiment, the start position of the trigger 124 is defined as the reference position of the actuator section 116. In this position, the permanent magnet 82 fixed to each extension 125 confronts, but is spaced from, the corresponding magnetoelectric element 142 on the printed circuit board 134 with the smallest gap being defined therebetween. As a result, the maximum voltage is generated from the magnetoelectric element 142.

When the operator squeezes any one trigger 124 with a finger, this trigger 124 rotates about the pin 122 from the start or reference position shown in FIG. 8. Simultaneously, the short-circuit element 140 is disengaged from the pair of electrodes 138, and moves together with the permanent magnet 144 upward from the lowermost position along an arcuate path about the pin 122. When the trigger 124 is fully squeezed to reach an end position, the permanent magnet 144 is in a position farthest from the magnetoelectric element 142 in the arcuate path of the magnet, and consequently, the minimum voltage is generated from the magnetoelectric element 142.

After that, when the operator releases the trigger 124 from the finger, the trigger 124 rotates by the biasing force of the torsion coil spring 126 from the end position toward the reference position. While the trigger 124 freely moves between the reference position and the end position depending on various force applied by the finger of the operator, the magnetoelectric element 142 generates a voltage which decreases in linear correspondence with the increase in distance between the element 142 and the magnet 144. Such an analog output voltage generated by the magnetoelectric element 142 is converted to a digital signal which in turn is passed to the CPU 136.

In the same manner as the CPU 86 in the manual input units 50, 100 of the first and second embodiments, the CPU 136 receives an open signal from the electrodes 138, at the instant when the trigger 124 moves from the reference position to disengage the short-circuit element 140 from the electrodes 138. The CPU 136 is programmed, in the same manner as the CPU 86, to calculate a reference output-voltage value on the basis of a reference voltage ($V_0$) which is defined by a voltage generated by the magnetoelectric element 142 at the instant when receiving the open signal, and to then select a reference data corresponding to the reference output-voltage value.

After that, while the trigger 124 moves between the reference position (displacement=0) and the end position (displacement=Max) and the pair of electrodes 138 are kept in an opened state, a voltage $V_j$ generated from the magnetoelectric element 142 linearly corresponding to the distance from the permanent magnet 144 is entered into the CPU 136 and is calculated therein to produce an output-voltage value $V_{out}$ of the generator section 118 (i.e., $V_{out}=V_j-V_0$). The CPU 136 then selects data corresponding to the output-voltage value $V_{out}$ on the basis of a predetermined relationship. In this manner, the data selected in correspondence with the displacement of the trigger 124 from the reference position is output from the CPU 136 as a data signal, and then the data signal is transmitted to the external processing unit via the infrared generator 146.

Since the manual input unit 110 has two actuator sections 116 and two generator sections 118 associated respectively therewith, it can be used as an input unit for entering two-dimensional coordinate data, such as a pointing device widely used in data processing units, by, e.g., setting the data signals output from the CPU 136 in response to the displacement of the lefthand trigger 124 as X-coordinate signals and the data signals output from the CPU 136 in response to the displacement of the righthand trigger 124 as Y-coordinate signals. In this case, it is possible to instantaneously move a cursor or a character to a desired coordinates position on a screen, when the operator operates the respective triggers 124 to put them on respective selected positions, in a different manner to the conventional pointing device.

Also, it is possible to transmit at desired instants or simultaneously two types of data signals, each relating to a one-dimensional parameter such as a beam magnitude of a laser gun or a car speed in a game, to an external processing unit from the signal transmission section 120. In this case, the light-receptive element 98 as described may be arranged near the window 115 of the frame 114, so that a two-dimensional coordinates data signal is transmitted on the basis of a luminance signal from the light-receptive element 98.

According to the manual input unit 110, in the same way as in the manual input units 50, 100, even if the output voltage characteristic of each magnetoelectric element 142 has varied due to an environmental temperature change, it is possible to initialize the output-voltage value of each magnetoelectric element 142 by the CPU 136 to which the open signal is entered from the electrodes 138, through the same steps as described with reference to the manual input unit 50, but which is caused by a different manual operation in that the operator merely squeezes each trigger 124 to displace the same from the reference position to the end position. Further, the manual input unit 110 has an advantage that, similar to the manual input unit 100, it is unnecessary to force the operator to fully squeeze the trigger 124 to locate the same at the reference position for initializing the output voltage, which operation is irrespective of the proper operation for, e.g., a game.

While the present invention is described above on the basis of the preferred embodiments thereof, it should be noted that the present invention is not limited thereto but may include various modifications or variations. For example, the switching means of the generator section is not limited to a combination of a pair of electrodes and a short-circuit element but may be any type of switch which is closed when the trigger is in the reference position and is opened when the trigger is moved away therefrom. The generating means in the generator section may employ a solenoid instead of the permanent magnet, as a counterpart element of the magnetoelectric element. Also, various generating means such as a photoelectric encoder may be employed other than the combination of the magnetoelectric element and the magnet, provided that it can generate a voltage linearly corresponding to the displacement of the trigger from the reference position. Further, a pair of electrodes and a magnetoelectric element may be provided on a movable trigger, while a short-circuit element and a permanent magnet as counterpart elements thereof may be fixedly secured to a frame. Moreover, a linearly movable trigger may be adopted in the actuator section in place of the illustrated pivot type trigger.

In any way, it will be understood by those skilled in the art that various changes and modifications may be made without departing from the spirit and scope of the invention. The scope of the invention is therefore to be determined solely by the appended claims.

We claim:

1. A manual input unit comprising:

an actuator section movably supported in a frame;

a generator section associated with said actuator section, to output a voltage which corresponds to a movement of said actuator section on said frame;

a signal transmission section associated with said generator section, to transmit a data signal which corresponds to an output-voltage value of said generator section to an external processing unit;

said generator section including a switching means which is closed when said actuator section is in a reference position and is opened when said actuator section is away from said reference position, and a generating means for generating a voltage linearly corresponding to a displacement of said actuator section from said reference position, said switching means and said generating means being connected, in parallel, to said signal transmission section; and said signal transmission section being provided for defining, on the basis of a voltage generated from said generating means at an instant when said actuator section departs from said reference position to open said switching means, a voltage subsequently generated from said generating means while said switching means is in an opened state as said output-voltage value of said generator section, and for selecting data corresponding to said defined output-voltage value from stored data in accordance with a predetermined relationship to transmit said selected data as said data signal.

2. A manual input unit as defined by claim 1, wherein said signal transmission section calculates, as said output-voltage value of said generator section, a difference between a reference voltage generated from said generating means at an instant when said switching means is opened and a voltage subsequently generated from said generating means while said switching means is in an opened state.

3. A manual input unit as defined by claim 1, wherein said switching means of said generator section comprises a pair of electrodes, each being separately and electrically connected to said signal transmission section, and a short-circuit element arranged movably relative to said pair of electrodes to short said pair of electrodes to each other when said actuator section is in said reference position.

4. A manual input unit as defined by claim 3, wherein said pair of electrodes are fixedly joined to said frame, and said short-circuit element is fixedly joined to said actuator section.

5. A manual input unit as defined by claim 4, wherein said signal transmission section comprises a circuit board fixedly secured to said frame, and an internal processing unit mounted onto said circuit board to define said output-voltage value of said generator section and selecting said data, and wherein said pair of electrodes are connected to said internal processing unit on said circuit board.

6. A manual input unit as defined by claim 5, wherein said signal transmission section further comprises a signal transmission element electrically connected to said internal processing unit to transmit said data signal to said external processing unit through radio-communication.

7. A manual input unit as defined by claim 3, wherein said short-circuit element is made of a pressure-sensitive conductive rubber material.

8. A manual input unit as defined by claim 1, wherein said generating means of said generator section comprises a magnetoelectric element electrically connected to said signal transmission section, and a magnet arranged to be movable relative to said magnetoelectric element to make said magnetoelectric element generate a voltage which corresponds to a displacement of said magnet from said magnetoelectric element.

9. A manual input unit as defined by claim 8, wherein said magnetoelectric element is fixedly joined to said frame, and said magnet is fixedly joined to said actuator section.

10. A manual input unit as defined by claim 9, wherein said signal transmission section comprises a circuit board, fixedly secured to said frame, and an internal processing unit, mounted onto said circuit board, to define said output-voltage value of said generator section and selecting said data, and wherein said magnetoelectric element is connected to said internal processing unit on said circuit board.

11. A manual input unit as defined by claim 10, wherein said signal transmission section further comprises a signal transmission element electrically connected to said internal processing unit to transmit said data signal to said external processing unit through radio-communication.

12. A manual input unit as defined by claim 1, wherein said actuator section comprises at least one trigger movably attached to said frame, and wherein both of said switching means and said generating means of said generator section are provided in association with each of said triggers.

13. A manual input unit as defined by claim 12, wherein said actuator section comprises a spring interposed between said frame and said trigger to bias said trigger toward a start position.

14. A manual input unit as defined by claim 13, wherein said reference position of said actuator section is said start position of said trigger.

15. A manual input unit as defined by claim 13, wherein said reference position of said actuator section is an end position of said trigger.

16. A manual input unit as defined by claim 11, wherein said external processing unit includes a display and said actuator section includes at least two said triggers, and wherein said signal transmission section selects plane coordinate data in said display in correspondence with two types of output-voltage values from said generating means associated with each of said triggers of said actuator section, to transmit a coordinates data signal to said external processing unit.

17. A manual input unit as defined by claim 1, wherein said external processing unit includes a display and said signal transmission section further includes a light-receptive element for sensing a luminance of an image displayed on said display, and wherein said signal transmission section selects plane coordinate data in said display in correspondence with a luminance signal of said light-receptive element, to transmit a coordinate data signal to said external processing unit.

* * * * *